(12) United States Patent
Joshi et al.

(10) Patent No.: US 11,378,277 B2
(45) Date of Patent: Jul. 5, 2022

(54) GAS TURBINE ENGINE AND COMBUSTOR HAVING AIR INLETS AND PILOT BURNER

(71) Applicant: General Electric Company, Schenectady, NY (US)

(72) Inventors: Narendra Digamber Joshi, Schenectady, NY (US); Shawn David Wehe, Niskayuna, NY (US); ShihYang Hsieh, Cohoes, NY (US); Changjin Yoon, Niskayuna, NY (US); Owen James Sullivan Rickey, Saratoga Springs, NY (US); Joseph Douglas Monty, Boxford, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 790 days.

(21) Appl. No.: 15/987,070

(22) Filed: May 23, 2018

(65) Prior Publication Data
US 2019/0309951 A1    Oct. 10, 2019

Related U.S. Application Data

(60) Provisional application No. 62/653,656, filed on Apr. 6, 2018.

(51) Int. Cl.
*F23R 3/34* (2006.01)
*F23R 3/28* (2006.01)
(Continued)

(52) U.S. Cl.
CPC .............. *F23R 3/343* (2013.01); *F02C 3/14* (2013.01); *F23R 3/002* (2013.01); *F23R 3/286* (2013.01); *F05D 2240/35* (2013.01)

(58) Field of Classification Search
None
See application file for complete search history.

(56) References Cited

U.S. PATENT DOCUMENTS

| 4,584,834 A * | 4/1986 | Koshoffer ................ F23R 3/04 60/737 |
| 4,891,936 A | 1/1990 | Shekleton et al. |

(Continued)

FOREIGN PATENT DOCUMENTS

| CN | 101324344 A | 12/2008 |
| CN | 102985758 A | 3/2013 |

(Continued)

OTHER PUBLICATIONS

First Office Action and Translation issued in connection with corresponding CN Application No. 201910272079.6 dated Apr. 13, 2020.

*Primary Examiner* — Jason H Duger
(74) *Attorney, Agent, or Firm* — Venable LLP; Elizabeth C. G. Gitlin; Michele V. Frank

(57) ABSTRACT

A combustor includes a circumferential main combustion chamber and a plurality of air inlets, the plurality of air inlets dispersing air into the circumferential main combustion chamber. The combustor also includes at least one swirl-stabilized pilot burner, which disperses combustion gases into the circumferential main combustion chamber. The air inlets and the swirl-stabilized pilot burner are aligned at least partially in a radial direction and at least partially in a circumferential direction.

20 Claims, 10 Drawing Sheets

(51) Int. Cl.
*F02C 3/14* (2006.01)
*F23R 3/00* (2006.01)

(56) References Cited

U.S. PATENT DOCUMENTS

| | | | |
|---|---|---|---|
| 4,928,479 A | 5/1990 | Shekleton et al. | |
| 4,936,090 A | 6/1990 | Shekleton | |
| 5,001,895 A * | 3/1991 | Shekleton | F23R 3/283 60/738 |
| 5,317,864 A | 6/1994 | Shorb et al. | |
| 5,966,926 A | 10/1999 | Shekleton et al. | |
| 6,530,744 B2 * | 3/2003 | Liotta | F01D 9/041 415/115 |
| 7,506,511 B2 * | 3/2009 | Zupanc | F23R 3/286 60/746 |
| 8,707,707 B2 * | 4/2014 | Venkataraman | F23R 3/346 60/772 |
| 9,052,114 B1 | 6/2015 | Toqan et al. | |
| 9,091,446 B1 * | 7/2015 | Toqan | F23R 3/34 |
| 2016/0138808 A1 | 5/2016 | Huebner et al. | |
| 2017/0009993 A1 | 1/2017 | Monahan et al. | |
| 2018/0094817 A1* | 4/2018 | Proscia | F23R 3/286 |
| 2018/0156464 A1* | 6/2018 | Dai | F23R 3/14 |

FOREIGN PATENT DOCUMENTS

| | | |
|---|---|---|
| CN | 107327872 A | 11/2017 |
| CN | 107702148 A | 2/2018 |
| EP | 0349635 B1 | 1/1990 |
| EP | 0979972 A1 | 2/2000 |
| WO | 201328164 A2 | 2/2013 |

\* cited by examiner

GAS TURBINE ENGINE AND COMBUSTOR HAVING AIR INLETS AND PILOT BURNER

CLAIM OF PRIORITY

This application claims priority to U.S. Application No. 62/653,656, filed on Apr. 6, 2018. The disclosure of U.S. Application No. 62/653,656 is incorporated herein by reference.

BACKGROUND

The present disclosure relates generally to turbine engines and, more specifically, to a tangential radial inflow combustor assembly having a pilot burner and main combustion chamber arrangement.

A conventional gas turbine engine typically includes a compressor for compressing air that is mixed with fuel and ignited in a combustor for generating a high pressure, high temperature gas stream, referred to as combustion gas. The combustion gases flow to a turbine, where they are expanded, converting thermal energy from the combustion gases to mechanical energy for driving a shaft to power the compressor and produce output power for powering an electrical generator or to produce thrust in Aviation applications, for example.

In at least some known gas turbines, a first set of guide vanes is coupled between an outlet of the compressor and an inlet of the combustor. The first set of guide vanes facilitates reducing swirl (i.e., removing bulk swirl) of a flow of air discharged from the compressor such that the flow of air is channeled in a substantially axial direction towards the combustor. A second set of guide vanes is coupled between an outlet of the combustor and an inlet of the turbine. The second set of guide vanes facilitates increasing swirl (i.e., reintroducing bulk swirl) of a flow of combustion gas discharged from the combustor such that flow angle requirements for the inlet of the turbine are satisfied. However, redirecting the flows of air and combustion gas with the first and second sets of guide vanes increases operating inefficiencies of the gas turbine. Moreover, including additional components, such as the first and second sets of guide vanes generally adds weight, cost, and complexity to the gas turbine.

Tangential radial inflow combustors may be used to provide the necessary swirl, thereby reducing or eliminating the need for either the first or second sets of guide vanes, or possibly both.

SUMMARY OF THE INVENTION

In one aspect, a turbine engine includes a compressor assembly for discharging compressed air into a combustor assembly, the combustor assembly being in flow communication with the compressor assembly. The combustor assembly receives the compressed air from the compressor assembly and includes a circumferential main combustion chamber and a plurality of air inlets, the plurality of air inlets dispensing air into the circumferential main combustion chamber. The combustor assembly also includes at least one swirl-stabilized pilot burner which dispenses combustion gases into the circumferential main combustion chamber. Each swirl-stabilized pilot burner includes a can-type burner tube and a swirler mixer at an upstream end. The turbine engine also includes a turbine assembly in flow communication with the combustor assembly. The turbine assembly receives combustion gas from the combustor assembly. The swirl-stabilized pilot burner and air inlets are circumferentially spaced around the circumferential main combustion chamber such that the swirl-stabilized pilot burner interfaces with the circumferential main combustor changer at a different circumferential location than that of each of the air inlets.

In another aspect, a combustor includes a circumferential main combustion chamber and a plurality of air inlets, the plurality of air inlets dispensing air into the circumferential main combustion chamber. The combustor also includes at least one swirl-stabilized pilot burner, which disperses combustion gases into the circumferential main combustion chamber. The air inlets and the swirl-stabilized pilot burner are aligned at least partially in a radial direction and at least partially in a circumferential direction.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Figure 1:
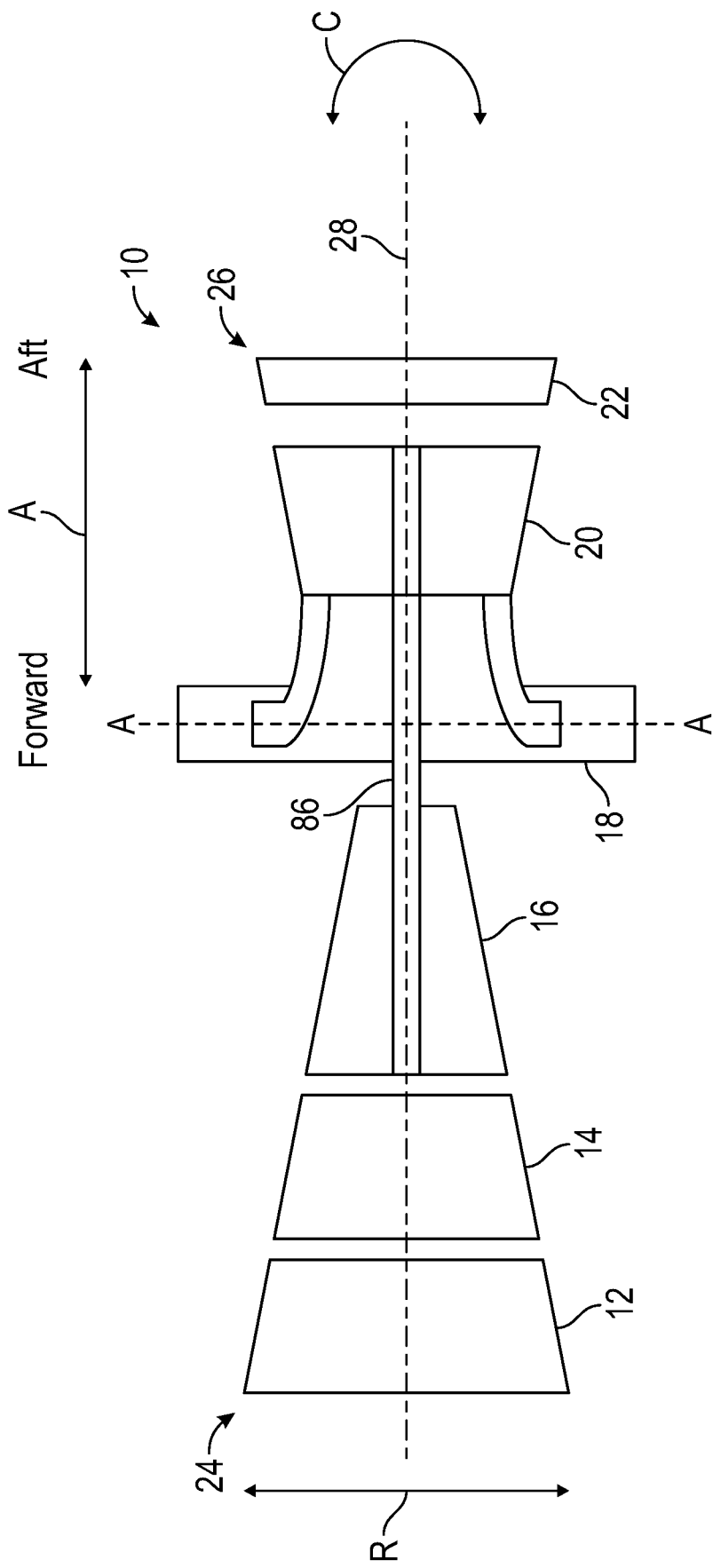
FIG. 1 is a schematic illustration of an exemplary turbine engine.
Figure 3:
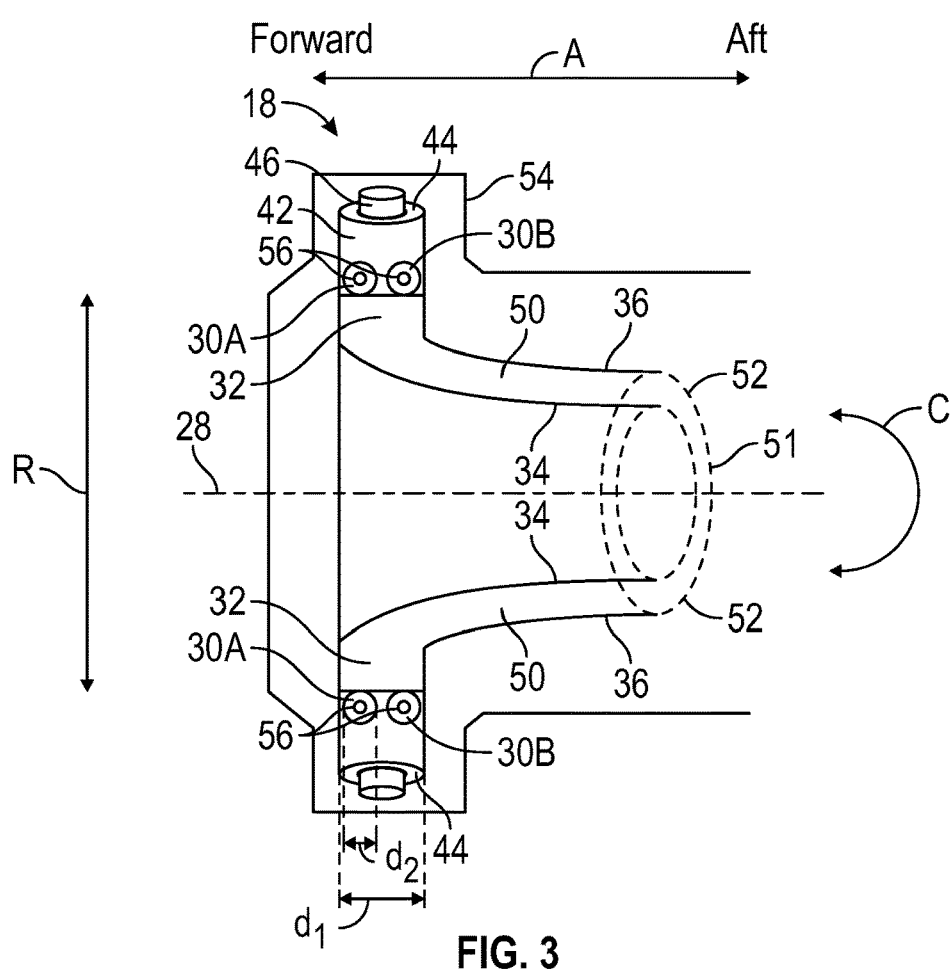
FIG. 3 is a side view of a combustor assembly shown in FIG. 2.

As used herein, and as marked 'A' in FIGS. 1 and 3, the term "axial" refers to a direction aligned with a central axis or shaft of the gas turbine engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine.

Figure 2:
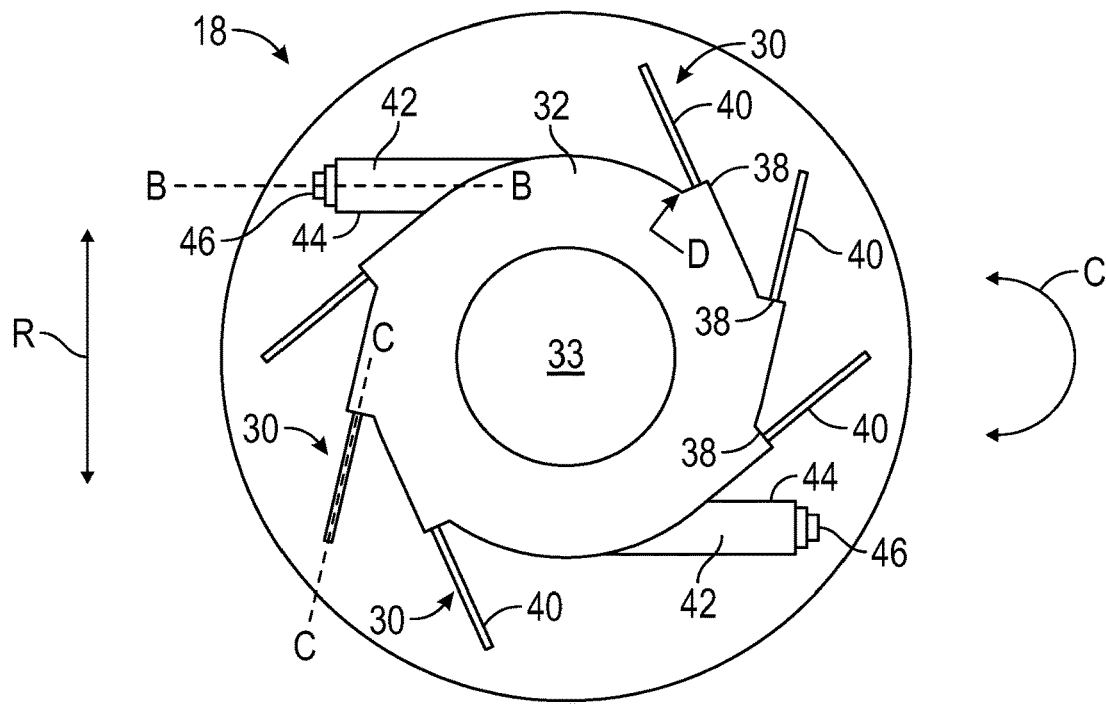
FIG. 2 is a forward-looking-aft view of a combustor assembly that may be used in the gas turbine engine shown in FIG. 1.

As used herein, and as marked 'C' in FIGS. 1, 2 and 3, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, and as marked 'R' in FIGS. 1, 2 and 3, the term "radial" refers to a direction moving outwardly away from the central axis of the gas turbine. A "radially inward" direction is aligned toward the central axis moving toward decreasing radii. A "radially outward" direction is aligned away from the central axis moving toward increasing radii.

As used herein, the term "high-G" or "high Gravity" refers to high flow acceleration, which may be in a tangential/circumferential, radial or axial direction, and may be a linear acceleration of an angular acceleration.

FIG. 1 is a schematic illustration of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Turbine engine 10 has an intake 24 and an exhaust 26. Turbine engine 10 further includes a centerline 28 about which fan assembly 12, booster compressor assembly 14, high-pressure compressor assembly 16, and turbine assemblies 20 and 22 rotate.

In operation, air entering turbine engine 10 through intake 24 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 26. A high-pressure shaft 86, is concentrically disposed about the centerline 28 and mechanically couples the high-pressure compressor assembly 16 to the high-pressure turbine assembly 20. The embodiments, combustor and turbine engine described herein are applicable to several possible engine architectures includes, but not limited to, turboshaft engines, turboprop engines, turbofan engines, turbojet engines, geared architecture engines, direct drive engines, land-based gas turbine engines, etc.

FIG. 2 is a fore-looking-aft view of combustor assembly 18, taken along cut line A-A in FIG. 1. A plurality of air inlets 30 are circumferentially spaced around a main combustion chamber 32. The plurality of air inlets 30 introduce air and atomized fuel to the main combustion chamber 32. Each of the plurality of air inlets 30 includes an air inlet tube 40 that, in one embodiment, is substantially cylindrical with a length to outer diameter ratio of between about 1:1 and about 2:1 to allow for sufficient fuel-air mixing. In other embodiments, the length to diameter ratio of each air inlet 30 is less than one. In other embodiments, the length to diameter ratio of each air inlet 30 is more than two. Fuel and air are mixed within each of the inlet tubes 40 to atomize of the air and fuel prior to the fuel-air mixture entering the main combustion chamber via mixing troughs 38. In the embodiment shown in FIG. 2, there are six air inlets 30 spaced around the main combustion chamber 32. However, in other embodiments, other numbers of air inlets 30 may be used such as about 2 to about 12 or more, including embodiments with a single air inlet 30. In a preferred embodiment, there are eight air inlets 30. In another embodiment, there are ten air inlets 30. In yet another embodiment, there are twelve air inlets 30. Mixing troughs 38 are spaced circumferentially around the radially outer periphery of the main combustion chamber 32 providing a cavity such that the fuel and air from the plurality of air inlets 30 can further mix after exiting the inlet tubes 40, but prior to travelling radially inward toward the center of the main combustion chamber 32.

Referring still to FIG. 2, a plurality of pilot burners 44 are circumferentially spaced around the main combustion chamber 32. In the embodiment shown in FIG. 2, two pilot burners 44 are shown, spaced substantially equally around the main combustion chamber 32. Stated otherwise, the two pilot burners 44 are roughly 180 degrees apart. However, in other embodiments, the two pilot burners 44 may be spaced 170/190 degrees apart or slightly asymmetrically spaced to mitigate combustion dynamics in the main combustion chamber 32, by offsetting how pressure waves develop and propagate from a first pilot burner 44 from how pressure waves develop and propagate from a second pilot burner 44. Other angular spacings between the two pilot burners are also possible such as 175/185, 165/195, 160/200, 150/210, 140/220, as well as other combinations. In other embodiments, other numbers of pilot burners 44 may be used, for example 3, 4, 5, 6, 7, 8 or higher. In addition, embodiments with a single pilot burner 44 are also possible. Each pilot burner includes a substantially cylindrical pilot burner tube 42 and a pilot swirler mixer 46. The pilot burners 44 are can-type, i.e., the geometry of the pilot burner tubes 42 is cylindrical. The pilot swirler mixer 46 introduces both fuel and air to the pilot burner tube 42 at an upstream end while simultaneously inducing a swirl in the fuel-air mixture. The fuel-air mixture is ignited via an igniter 74 (shown in FIG. 4) at the upstream end of pilot burner tube 42.

The pilot burners 44 that are integrated into the tangential radial inflow high-gravity combustor 18, as shown in FIG. 2, may be can-type swirl-stabilized pilot burners 44, providing stable, high-temperature combustion products to the main combustor chamber 30 to increase flame stability at the full range of engine operating conditions. The pilot burners 44 may also be stabilized via other methods other than swirl stabilization including plasma stabilization as well as via bluff bodies. Because the combustion products exiting the pilot burner tube 42 are swirl stabilized and already combusted, they help to stabilize the combustion dynamics within the main combustion chamber 32 where they are mixing with the fuel-air mixture from the plurality of air inlets 30. The combustion products exiting the pilot burner tube 42 maintain sufficient thermal energy within the main combustion chamber 32 to ensure that the fuel-air mixture from the plurality of air inlets 30 remains ignited after entering the main combustion chamber 32. The length to diameter ratio of each of the pilot burners 44 is adjusted so at to maintain combustor dynamics inside the pilot burner tube 42 within an acceptable range.

Still referring to FIG. 2, the pilot burners 44 are spaced circumferentially around the radially outer periphery of the main combustion chamber 32, along with the plurality of air inlets 30 such that any given circumferential location corresponds to either a pilot burner 44, or one or more of the plurality of air inlets 30, but not both. Stated otherwise, the pilot burner 44 does not circumferentially overlap with any air inlets of the plurality of air inlets 30. Different clock positions around the circumference of the main combustion chamber 32 define different circumferential locations. The pilot burners 44 interface with the circumferential main combustion chamber 32 at a different circumferential location than any air inlet of the plurality of air inlets 30. Stated otherwise, where each of the pilot burners 44 intersects with the main combustion chamber 32 occurs at a different clock position than where each air inlet of the plurality of air inlets 30 intersects with the main combustion chamber 32.

In addition, in the embodiment illustrated in FIG. 2, three of the plurality of air inlets 30 are located on, and spaced around one side of the main combustion chamber 32, and the remaining three of the plurality of air inlets 30 are located on, and spaced around the other side of the main combustion chamber 32, the first three and the second three groups of air inlets 30 being separated by the two pilot burners 44. In other embodiments with other numbers of air inlets 30 and pilot burners 44, similar arrangements with substantially equal spacings between and among air inlets 30 and pilot burners 44 help to ensure even acceptable temperatures, thermal gradients and combustion dynamics are maintained within the main combustion chamber 32.

Because of the internal combustion occurring in each pilot burner 44, the diameter of each pilot burner 44 is larger than the diameter of each of the plurality of air inlets 30, which have internal fuel-air mixing, but combustion does not occur internally therein. The diameter of each pilot burner 44 may be greater than the diameter of each air inlet by a factor of about 2:1 to about 4:1. The pilot burners 44 and the plurality of air inlets 30 are oriented such that their respective lengths are aligned to have a tangential (or circumferential) component as well as a radial component (i.e., component of the alignment). For example, each of the pilot burners 44, and the plurality of air inlets 30 are circumferentially spaced around the main combustion chamber 32 such that they are aligned primarily in a tangential direction, but also with some alignment in a radial direction. In the embodiment shown in FIG. 2, each of the pilot burners 44 and the plurality of air inlets 30 are aligned such that they are about 10-15 degrees from tangential, with the offset aligned radially inward. In other embodiments, each of the pilot burners 44 and the plurality of air inlets 30 are aligned such that they are radially inwardly offset from the tangential direction by about 5-20 degrees. In other embodiments, each of the pilot burners 44 and the plurality of air inlets 30 are aligned such that they are radially inwardly offset from the tangential direction by about 0-25 degrees. Stated otherwise, each of the pilot burners 44 and the plurality of air inlets 30 are oriented such that their respective lengths are aligned closer to a tangential direction than to a radial direction.

As discussed above, each of the pilot burners 44 and the plurality of air inlets 30 are aligned tangentially and radially with substantially no component of their alignment in the axial direction. With respect to the pilot burners 44, any alignment in the axial direction may be minimal. For example, the pilot burners 44 may have an alignment in the axial direction that is less than 3 degrees, less than 2 degrees, less than one degree or even less than half of a degree. In another embodiment in which it is preferable to reduce the radial "height" of the combustor, the pilot burners 44 may be angled about 45 degrees (plus or minus 10 degrees) toward an axially aft direction. Also shown in FIG. 2 is opening 33, through which high-pressure shaft 86 passes.

FIG. 3 is a side view of combustor assembly 18. The plurality of air inlets 30 are in a "doublet" configuration and includes an axially forward plurality of air inlets 30A and an axially aft plurality of air inlets 30B, the axially aft plurality of air inlets 30B being adjacent to, and axially aft of, the axially forward plurality of air inlets 30A. Each of the plurality of air inlets 30 shown in FIG. 2 may include this doublet configuration, with the axially forward plurality of air inlets 30A including, for example, 6 air inlets, and the axially aft plurality of air inlets 30B also including 6 inlets, for a total of 12 air inlets. In addition, "triplet" and "quadruplet" configurations are also possible with three pluralities of air inlets 30 and four pluralities of air inlets 30, respectively, axially adjacent to each other.

The combustor assembly 18 illustrated in FIG. 3 is an annular combustor with the cross section of the main combustion chamber 32 circumferentially translated around centerline 28. The main combustion chamber 32 forms a circumferential cavity extending around centerline 28. The pilot burners 44, each with a swirler mixer 46 and pilot burner tube 42 shown in FIG. 2, have an axial width or diameter, $d_1$, that is the same as or slightly greater than the combined axial widths (or diameters, $d_2$) of the axially forward plurality of air inlets 30A and the axially aft plurality of air inlets 30B. Similarly, in a "triplet" configuration, each of the pilot burners 44 would have an axial width or diameter that is the same as or slightly greater than the combined axial widths (or diameters) of the three pluralities of air inlets 30. Similarly, in a "quadruplet" configuration, each of the pilot burners 44 would have an axial width or diameter that is the same as or slightly greater than the combined axial widths (or diameters) of the four pluralities of air inlets 30.

Still referring to FIG. 3, the main combustion chamber 32 is radially inward of the axially forward plurality of air inlets 30A, the axially aft plurality of air inlets 30B, and the pilot burners 44, and receives combustion gases from the pilot burners 44 and fuel-air mixture flows from the pluralities of air inlets 30. After mixing and/or combusting in the main combustion chamber 32, combustion gases move axially downstream (or axially aft) between a combustor inner liner 34 and a combustor outer liner 36. The combustor inner liner 34 connects with the axially forward wall of the main combustion chamber 32 and forms the radially inner wall of an axial portion 50 of the combustor. The combustor outer liner 36 connects with the axially aft wall of the main combustion chamber 32 and forms the radially outer wall of the axial portion 50 of the combustor. Each of the combustor inner liner 34 and the combustor outer liner 36 may be cooled via film cooling holes (not shown), and/or other cooling structures. In addition, each of the combustor inner liner 34 and the combustor outer liner 36 may have a thermal barrier coating (TBC), a bond coating or an environmental barrier coating (EBC) on their respective surfaces that are exposed to combustion gases. Each of the combustor inner liner 34 and the combustor outer liner 36 may also include dilution holes (not shown) which introduce air into the interior of the combustor axial portion 50 and are used for quenching rich combustion gases in the combustor axial portion 50 and/or to lower the temperature of the combustion gases before they exit the combustor assembly 18. Both the combustor inner liner 34 and the combustor outer liner 36 curve gradually radially inward as they extend axially aft such that the annular flow area defined between the combustor inner liner 34 and the combustor outer liner 36 may decrease. As the radius of the flowpath in the axial portion 50 of the combustor decreases, high tangential velocity of the combustion gases is established as a result of conservation of angular momentum.

The high tangential velocity of the combustion gases within the axial portion 50 of the combustor assembly 18 provide a desired swirl angle at the combustor exit 52. Accordingly, combustion gases enter the high-pressure turbine assembly 20 without the need for a first stage turbine vane or nozzle (i.e., the second set of guide vanes discussed above). Stated otherwise, the high tangential velocity of the combustion gases within the axial portion 50 of the combustor assembly 18 enter the high-pressure turbine assembly 20 at a first stage turbine blade with the desired swirl angle, without the need for a first stage turbine vane. Such configurations have a shorter overall gas turbine engine length, reduced weight, reduced complexity, reduced pressure drop, and reduced part count. In other embodiments, the high tangential velocity of the combustion gases within the axial portion 50 of the combustor assembly 18 may allow for a reduction in size of a first stage turbine vane, but not the complete elimination of the first stage turbine vane. Such configurations may also have a shorter overall gas turbine engine length, reduced weight, reduced complexity, reduced pressure drop, and reduced cooling flow to the first stage turbine vane.

As shown in FIG. 3, each air inlet tube 40 of the plurality of air inlets 30A, 30B includes a fuel injector 56 that is positioned in the center of each air inlet tube 40 such that it is concentric within the air inlet tube 40. Each fuel injector 56 discharges a thin stream of fuel within the air inlet tube 40 that immediately begins mixing with, and atomizing within, compressed air within the air inlet tube 40. A combustor casing 54 encases the entire combustor assembly 18, as also illustrated in FIG. 3.

Figure 4:
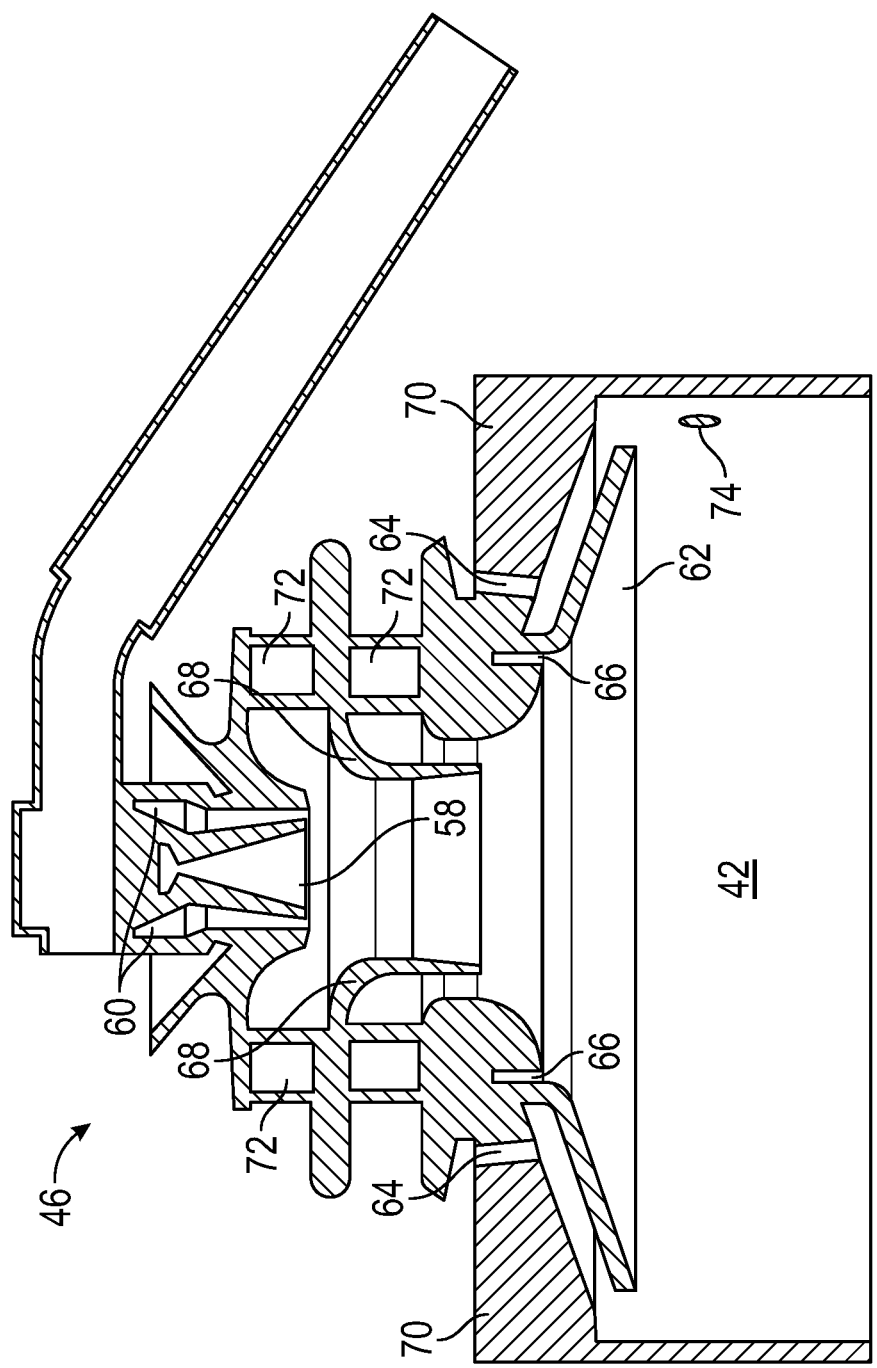
FIG. 4 is an enlarged cross-section of a pilot swirler mixer for the combustor assembly shown in FIG. 2 and FIG. 3.

FIG. 4 is an enlarged cross-section of the pilot swirler mixer 46 at the upstream end of the pilot burner tube 42. A fuel nozzle 58 is concentrically positioned within air passages 60 for dispersing fuel within the interior of a venturi 68. Air is also introduced into the interior of the venturi via the air passages 60 and swirl passages 72. A leakage passage 66 is formed between the pilot swirler mixer 46 and a mixer dome 70, slightly downstream of and radially outward of the venturi 68 trailing edge. A splash plate 62 extends into the pilot burner tube 42. Splash plate cooling passages 64 are disposed within the mixer dome 70 delivering cooling air to the back side of the splash plate 62. An igniter 74 is positioned within the pilot burner tube 42 proximate the upstream end of the pilot burner tube 42. The igniter 74 ignites fuel and air from within the pilot burner tube 42 via an electrically-induced spark, via a flame transported from another location, or via an equivalent ignition source. The pilot burners 44 are can-type, i.e., the geometry of the pilot burner tubes 42 is cylindrical. In addition, the pilot swirler mixer 46 provides swirl-stabilized combustion within the pilot burners 44, via the pilot swirler mixer 46 mixing properties and also as a result of a spiral configuration of the air passages 60. The swirling of the fuel and air within the pilot burner tubes 42 results in stabilized combustion due to enhanced mixing and atomization of the fuel and air, enhanced ignition of the fuel, and even temperature distribution due to reducing thermal gradients within the pilot burner tubes 42.

Figure 5:
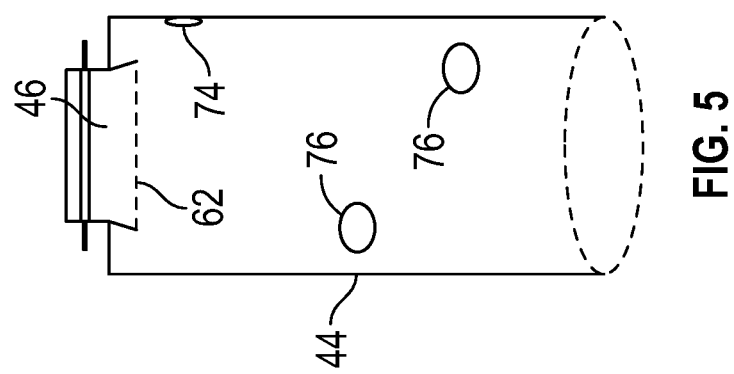
FIG. 5 is cross-section view of a pilot burner for the combustor assembly shown in FIG. 2 and FIG. 3.

FIG. 5 is a cross-section view of the pilot burner 44 taken along cut-line B-B shown in FIG. 2, including the igniter 74, the pilot swirler mixer 46 and the splash plate 62 all disposed at the upstream end of the pilot burner tube 42. The pilot burner tube 42 may include dilution holes 76 spaced circumferentially around the pilot burner tube 42 beginning approximately half a diameter downstream from the upstream end of the pilot burner tube 42, and continuing toward the downstream end of the pilot burner tube 42. The dilution holes 76 introduce additional air within the pilot burner tube 42 to encourage combustion of any uncombusted fuel.

Figure 6:
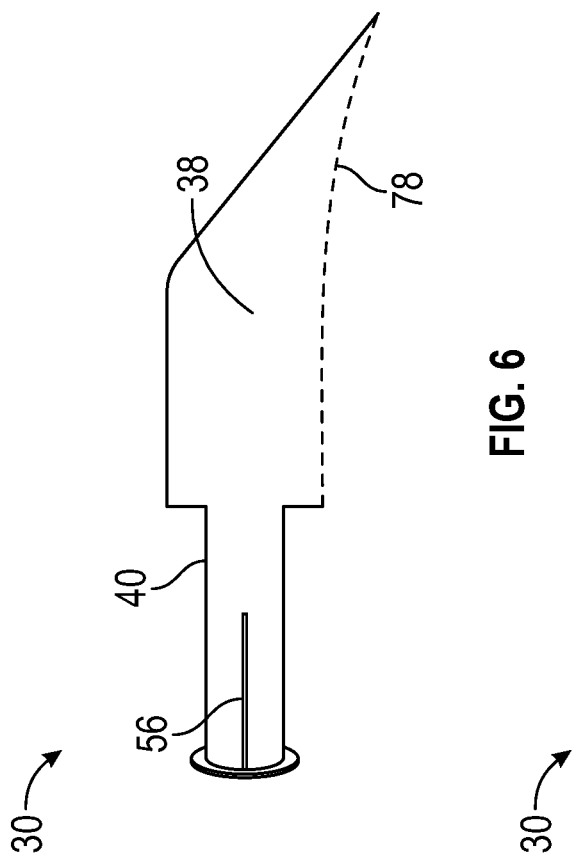
FIG. 6 is cross-section view of an air inlet for the combustor assembly shown in FIG. 2 and FIG. 3.

FIG. 6 is a cross-section view of an air inlet 30 taken along cut-line C-C shown in FIG. 2, including the fuel injector 56 located concentrically with the air inlet tube 40. The fuel injector 56 is thinner than the air inlet tube 40. In some embodiments, the fuel injector 56 may be a needle fuel injector concentrically disposed within the air inlet tubes 40, 40A, and/or 40B. As fuel disperses from the fuel injector 56 into the air inlet tube 40, begins mixing with and atomizing within the compressed air within the air inlet tube 40 prior to entering the mixing trough 38. A main combustion chamber boundary 78 is shown with a contoured dashed line qualitatively illustrating the circumferential curvature of the main combustion chamber 32.

Figure 7:
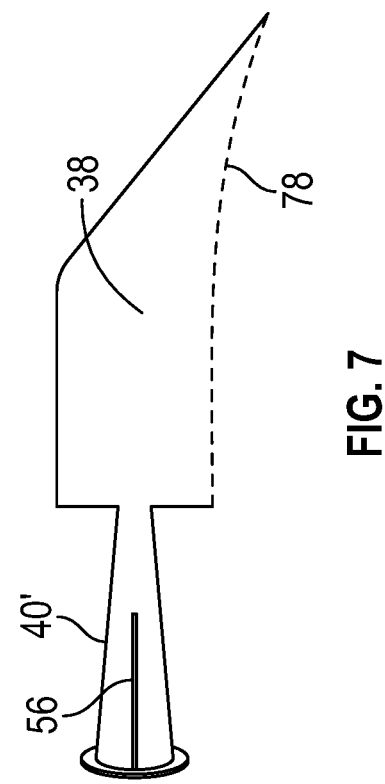
FIG. 7 is cross-section view of an air inlet for the combustor assembly shown in FIG. 2 and FIG. 3.

FIG. 7 is a cross-section view of an air inlet 30 taken along cut-line C-C shown in FIG. 2, including the fuel injector 56 located concentrically with the air inlet tube 40'. In the embodiment shown in FIG. 7, the air inlet tube 40' is conical, thereby reducing boundary layers forming adjacent the interior surface of the conical air inlet tube 40', while also encouraging atomization of the fuel that is dispensed from the fuel injector 56.

Figure 8:
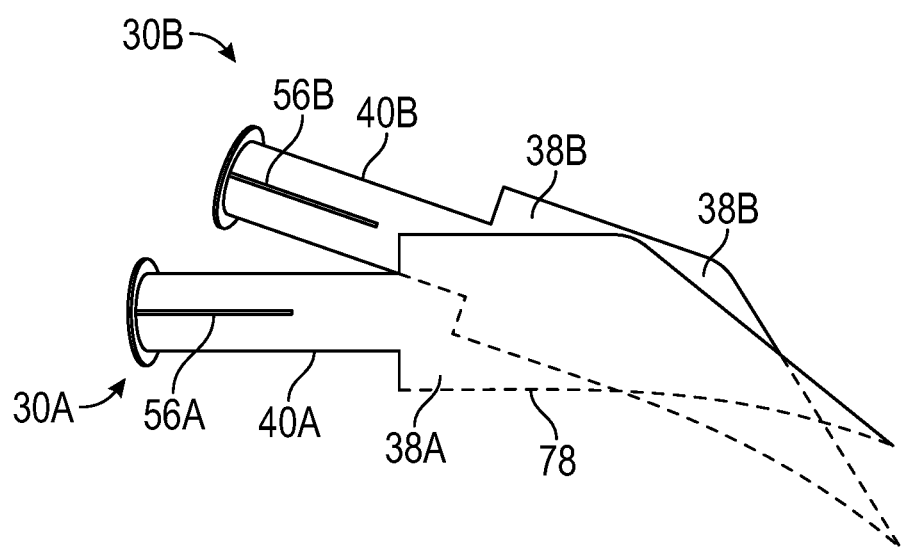
FIG. 8 is cross-section view of a plurality of air inlets for the combustor assembly shown in FIG. 2 and FIG. 3.

FIG. 8 is a forward-looking-aft view of a plurality of air inlets 30, taken at location D in FIG. 2. An axially forward air inlet 30A is shown in the foreground and an axially aft air inlet 30B is shown in the background. Each of the axially forward air inlet 30A and the axially aft air inlet 30B include fuel injectors 56A, and 56B, respectively as well as air inlet tubes 40A and 40B, and mixing troughs 38A and 38B, respectively. As illustrated in FIG. 8, the axially forward air inlet 30A and the axially aft air inlet 30B are offset from each other such that the axially aft air inlet 30B is circumferentially translated a number of degrees relative to the circumferential position of the axially forward air inlet 30A. The circumferential translation of the axially aft air inlet 30B relative to the axially forward air inlet 30A may be on the order of 3-9 degrees or a different number or fraction of degrees, and may mitigate combustor dynamics within the main combustion chamber 32, by offsetting how pressure waves develop and propagate from the fuel-air mixture dispensed from the axially forward air inlet 30A from that of the axially aft air inlet 30B. In addition, a "doublet" configuration such as the embodiment shown in FIG. 8, can be beneficial for the magnitude of the offset (i.e., the number of degrees of the circumferential translation) to be different from one doublet pair to the next, further serving to mitigate combustor dynamics within the main combustion chamber 32.

Figure 9:
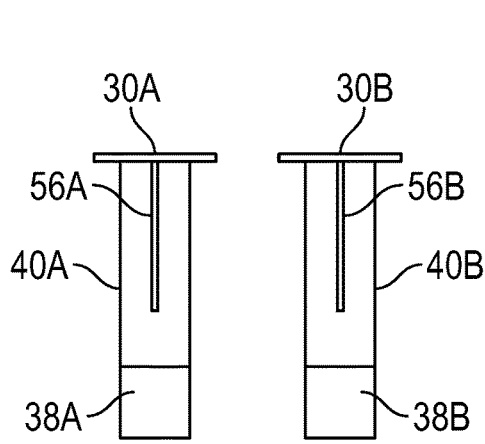
FIG. 9 is radially-inward looking view of a plurality of air inlets for the combustor assembly shown in FIG. 2 and FIG. 3.

FIG. 9 is a cross-section radially inwardly looking view of a plurality of air inlets 30 in a "doublet" configuration. In the embodiment shown in FIG. 9, the axially forward air inlet 30A and the axially aft air inlet 30B are parallel, neither oriented to have a component aligned in an axial direction. Each of the axially forward air inlet 30A and the axially aft air inlet 30B include fuel injectors 56A and 56B, respectively as well as air inlet tubes 40A and 40B, respectively and mixing troughs 38A and 38B, respectively. In addition, neither of the axially forward air inlet 30A and the axially aft air inlet 30B shown in FIG. 9 is circumferentially offset from the other.

Figure 10:
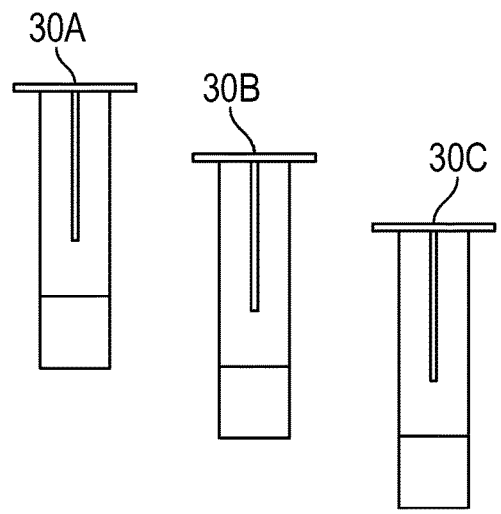
FIG. 10 is radially-inward looking view of a plurality of air inlets for the combustor assembly shown in FIG. 2 and FIG. 3.

FIG. 10 is a cross-section radially inwardly looking view of a plurality of air inlets 30 in a "triplet" configuration. In the embodiment shown in FIG. 10, a plurality of air inlets 30A, 30B, and 30C are all oriented such that they do not include a component of their alignment in an axial direction. In addition, in the embodiment shown in FIG. 10, air inlet 30B is circumferentially offset from air inlet 30A and air inlet 30C is circumferentially offset from air inlet 30B. The air inlet tubes 40 in all of the configurations of air inlets 30 described herein may have cross sections other than circular, such as slots as well as other non-circular geometries.

Figure 11:
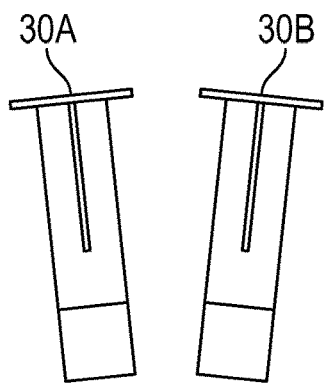
FIG. 11 is radially-inward looking view of a plurality of air inlets for the combustor assembly shown in FIG. 2 and FIG. 3.

FIG. 11 is a cross-section radially inwardly looking view of a plurality of air inlets 30 in a "doublet" configuration. In the embodiment shown in FIG. 11, the axially forward air inlet 30A and the axially aft air inlet 30B are oriented to be converging such that the axially forward air inlet 30A is aligned toward an axially aft direction and the axially aft air inlet 30B is aligned toward an axially forward direction. In such an arrangement, the respective axial alignments may be about 1 to about 10 degrees or another number or fraction of degrees. The embodiment shown in FIG. 11 directs the fuel-air mixtures exiting the respective air inlets 30 toward the center of the main combustion chamber 32, away from the walls of the main combustion chamber 32.

Figure 12:
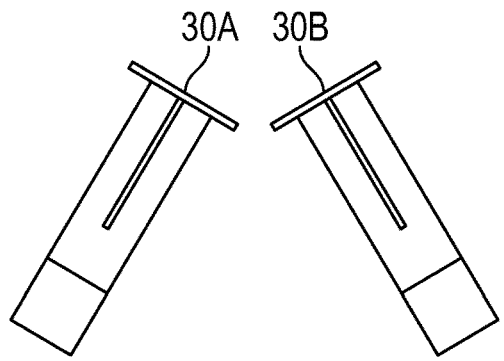
FIG. 12 is radially-inward looking view of a plurality of air inlets for the combustor assembly shown in FIG. 2 and FIG. 3.

FIG. 12 is a cross-section radially inwardly looking view of a plurality of air inlets 30 in a "doublet" configuration. In the embodiment shown in FIG. 12, the axially forward air inlet 30A and the axially aft air inlet 30B are oriented to be diverging such that the axially forward air inlet 30A is aligned slightly toward an axially forward direction and the axially aft air inlet 30B is aligned slightly toward an axially aft direction. In such an arrangement, the respective axial alignments may be about 1, 2, 3, 4, 5, 7 or 10 degrees or another number or fraction of degrees.

Figure 13:
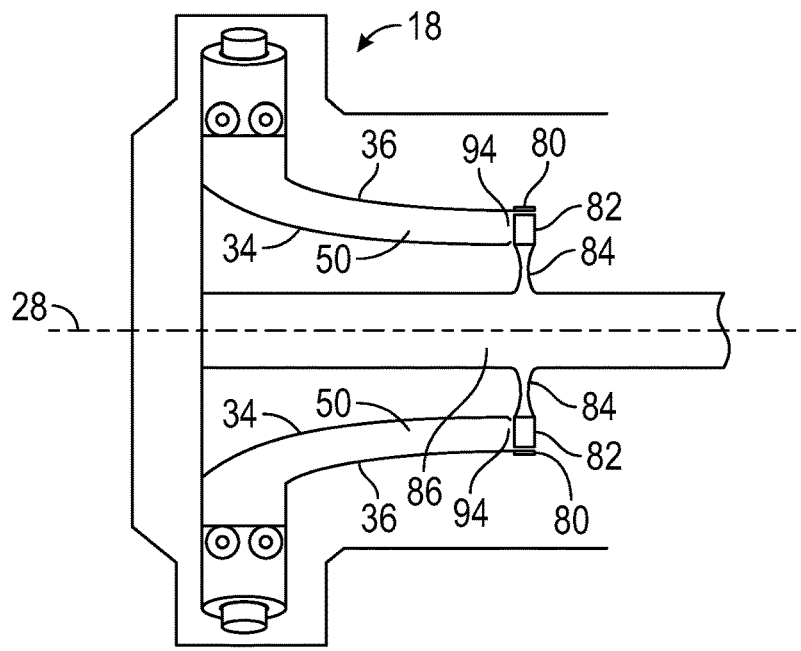
FIG. 13 is side view of a combustor assembly including an integral shroud.

FIG. 13 is a side view of combustor assembly 18 in a similar configuration to the embodiment shown in FIG. 3. In the embodiment shown in FIG. 13, a first stage turbine vane is not required due to the tangential velocity of the combustion gases within the combustor axial portion 50 being sufficient to deliver the desired swirl angle at a turbine rotor inlet 94. One or more circumferentially arranged integral shrouds 80 is mechanically coupled directly to the combustor outer liner 36, radially outward from a plurality of first stage turbine blades 82. The one or more circumferentially arranged integral shrouds 80 form the radially outer boundary of an annular turbine hot gas path. Each turbine blade of the plurality of first stage turbine blades 82 is mechanically coupled to at a radially inward end to a blade shank 84, which in turn is mechanically coupled to at a radially inward end to the high-pressure shaft 86. The high-pressure shaft 86 is concentrically disposed about the centerline 28 and mechanically couples the high-pressure compressor assembly 16 to the high-pressure turbine assembly 20. Each turbine blade of the plurality of first stage turbine blades 82 may receive internal cooling air from the blade shank 84. The one or more circumferentially arranged integral shrouds 80 may have internal cooling exiting the shroud into the hot gas path via a radially inner surface of the shroud. In addition, cooling and/or purge flow may enter the hot gas path via passages at the interface between the combustor outer liner 36 and the one or more circumferentially arranged integral shrouds 80.

Figure 14:
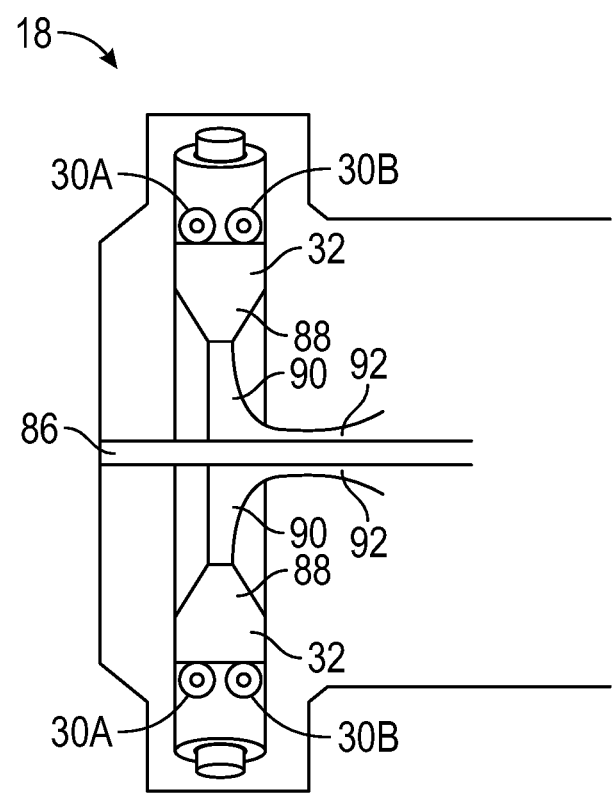
FIG. 14 is side view of a combustor assembly including a radial turbine.

FIG. 14 is a side view of combustor assembly 18 in an embodiment including a radial turbine 90. Combustion gases in the main combustion chamber 32 travel radially inward to a combustor radial portion 88 before travelling further radially inward to enter radial turbine 90. The main combustion chamber 32 circumferentially surrounds the radially inward radial turbine 90. Combustion gases act on radial turbine 90 causing rotational motion of radial turbine 90 and the high-pressure shaft 86, to which radial turbine 90 is mechanically coupled. Radial turbine 90, in turn, acts on the combustion gases such that they are redirected about 90 degrees as they flow past radial turbine 90, flowing in a substantially axial direction as they exit through the radial turbine exit 92. Stated otherwise, combustion gas enters radial turbine 90 in a radially inward direction and exit radial turbine 90 toward an axially aft direction. Upon exiting the radial turbine 90 via the radial turbine exit 92 combustion gases may exit the gas turbine engine 10 completely, or alternatively may enter a second turbine stage. The embodiment illustrated in FIG. 14 may have the advantage of not needing a first stage turbine nozzle. In addition, the embodiment illustrated in FIG. 14 may have the additional advantage of having a first stage turbine rotor (i.e., radial turbine 90) being located radially inward from the main combustor chamber 32, thereby reducing the axial length of the gas turbine engine 10, above and beyond any length reduction attributed to not needing a first stage turbine vane. The orientations of each of the plurality of air inlets 30 and the pilot burners 44, as well as the geometry of the combustor radial portion 88 cause the combustion gases to enter the radial turbine 90 at the desired swirl angle. In the embodiment illustrated in FIG. 14, the radial turbine 90 (along with the high-pressure shaft 86) at least partially occupies the space in the location where opening 33 occurs in the embodiment illustrated in FIG. 2.

Figure 15:
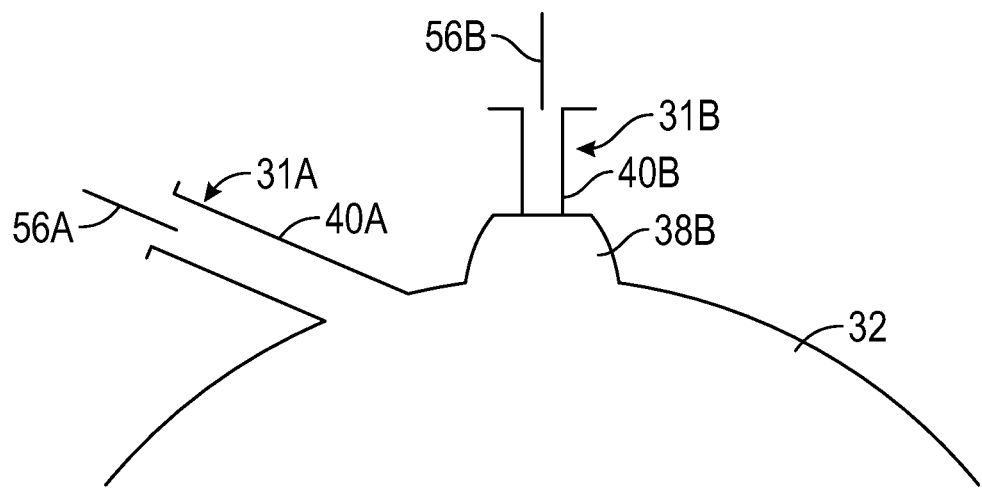
FIG. 15 is a cross-section view of a first air inlet and a second air inlet.

FIG. 15 is a cross-section view of a first air inlet 31A and a second air inlet 31B. The first air inlet 31A has a first fuel injector 56A concentrically disposed at the upstream end of the air inlet tube 40A, to maximize the distance within the air inlet tube 40A for fuel-air mixing. In addition, the first air inlet 31A intersects directly with main combustion chamber 32, without first interfacing at a mixing trough 38 (not shown). The second air inlet 31B has a second fuel injector 56B concentrically disposed at the upstream end of the air inlet tube 40B, to maximize the distance within the air inlet tube 40B for fuel-air mixing. In addition, the second air inlet 31B intersects with mixing trough 38B at a radially outer surface of the mixing trough 38B.

Figure 16:
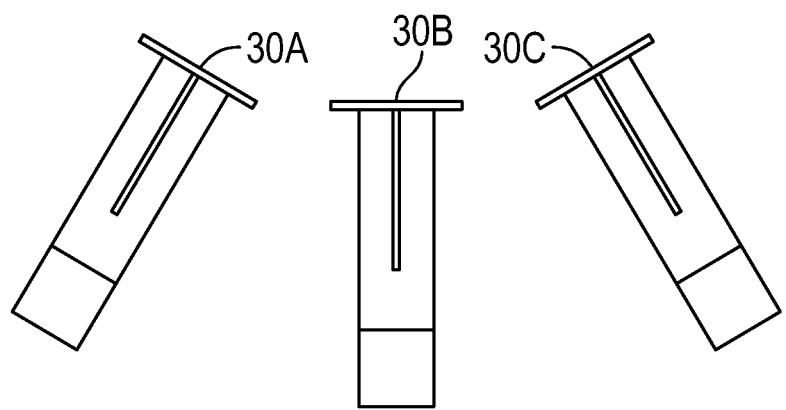
FIG. 16 is a cross-section radially inwardly looking view of a plurality of air inlets in a "triplet" configuration, according to aspects of the present embodiments.

FIG. 16 is a cross-section radially inwardly looking view of a plurality of air inlets 30 in a "triplet" configuration. In the embodiment shown in FIG. 16, a plurality of air inlets 30A, 30B, and 30C are all oriented such that they are all circumferentially offset from one another. In addition, in the embodiment shown in FIG. 16, air inlets 30A and 30C are oriented such that they are diverging away from each other.

Figure 17:
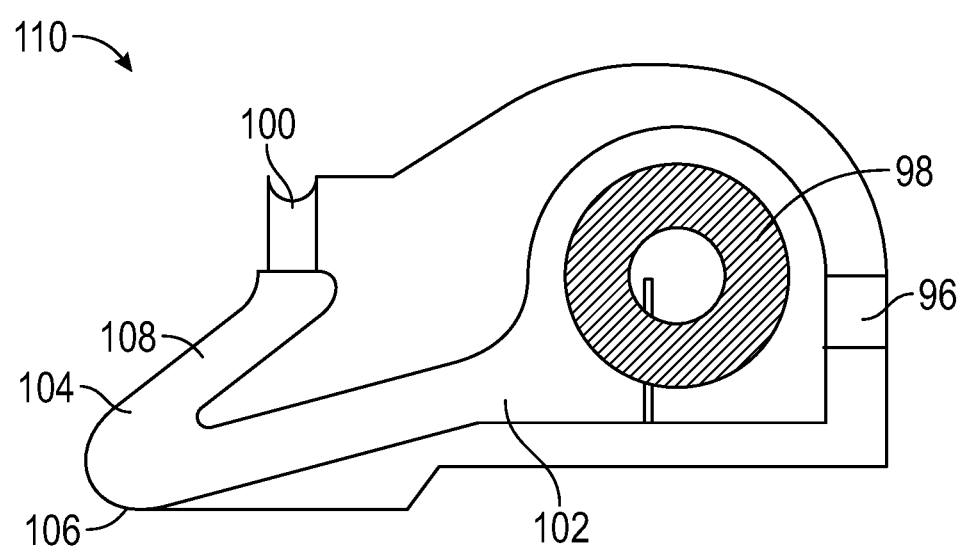
FIG. 17 is a cross-section view of an aero-slinger.

FIG. 17 illustrates an alternate embodiment using an aero-slinger 110 in place of the air inlets 30. The aero-slinger 110 includes an internal spray bar 98 which introduces fuel to the interior of the aero-slinger 110. Alternatively, a fuel injector designed to produce a flat spray conformal to the shape of the air slot 102 may be provided. Air is dispersed onto the spray bar via a primary air inlet 96. A fuel-air mixture flows through a first passageway 102 which joins with a second passageway 108 at a junction 104. A secondary air inlet 100 is fluidly coupled at the upstream end of the second passageway 108 allowing a secondary source of air to mix with the fuel-air mixture from the first passageway 102. The mixture of the flows from the first passageway 102 and the second passageway 108 is then dispensed through a circumferentially aligned slot 106 into the main combustor cavity 32 flowing primarily in a circumferential or tangential direction, but also travelling radially inward toward the center of the main combustion cavity 32. The fuel-air mixture from the aero-slinger 110 does not combust until after it enters the main combustion chamber 32. The aero-slinger may be operated in some operating modes such that only air flows through the primary air inlet 96 and/or the secondary air inlet 100 with no fuel flowing through the internal spray bar 98. The aero-slinger may be operated in other operating modes such that air and/or fuel-air mixtures are flowing through both the primary air inlet 96 and the secondary air inlet 100. In other modes of operation, one or more aero-slingers 110 may be shut off intermittently to provide enrichment of the combustion gases in the main combustion chamber 32, for example at low power conditions, to prevent flameout. Other configurations of aero-slingers 110 may also be used with the present embodiments.

Figure 18:
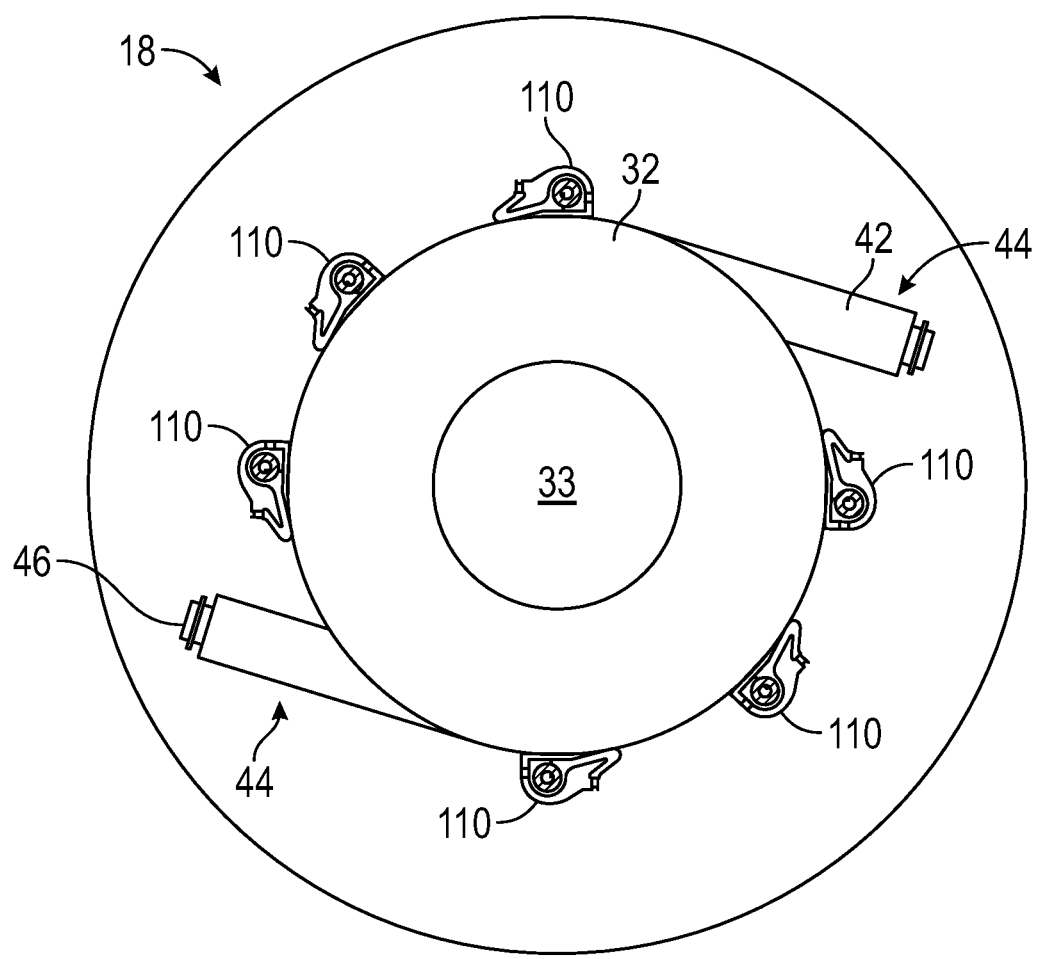
FIG. 18 is a forward-looking-aft view of a combustor assembly that may be used in the gas turbine engine shown in FIG. 1.

FIG. 18 illustrates an embodiment of a combustor assembly 18 using a plurality of aero-slingers 110 circumferentially spaced around the main combustion cavity 32 along with one or more pilot burners 44, each with burner tubes 42 and swirler-mixers 46. Each aero-slingers of the plurality of aero-slingers 110 along with the one or more pilot burners 44 are approximately evenly spaced circumferentially around the main combustion cavity 32 which is concentrically disposed around the opening 33, through which high-pressure shaft 86 passes. The embodiment of FIG. 18 is a reverse configuration compared to FIG. 2 as combustion gases within the main combustion chamber 32 flow in a counter-clockwise direction, fore-looking aft, rather than a clockwise direction. Either configuration (clockwise and counterclockwise) may be used with any of the embodiments disclosed herein.

During operation, different percentages of fuel (i.e., "fuel splits") and air may flow through each of the pilot burners 44 and the plurality of air inlets 30. For example, at a low power condition such as light-off or startup, the amount of fuel that flows through the pilot burners 44 may be a different percent of the overall fuel flowing to the combustor than at a higher power condition. In addition, the fuel-air mixture entering the main combustion chamber 32 from the plurality of air inlets 30 may be traveling at a different velocity than the combustion gases entering the main combustion chamber 32 from the pilot burners 44. During operation, there may be modes of operation or sub-modes in which only air is dispensed into the main combustion chamber 32 from one or more of the plurality of air inlets 30. Similarly, during operation, there may be modes of operation or sub-modes in which only air is dispensed from at least one of the pilot burners 44. However, during operation, at least one of the pilot burners 44 will be dispensing combustion gases into the main combustion chamber 32.

The different entry velocities of the fuel-air mixture from the plurality of air inlets 30 and the combustion gases from the pilot burners 44 encourage mixing, aid in keeping the fuel-air mixture ignited due to the combustion gases acting as a heat sources for the fuel-air mixture, and also stabilize the combustion within the main combustion chamber 32. The combustion gases from the pilot burners 44 act as a pilot flame or ignition source in the main combustion chamber 32 for the fuel-air mixture entering from the plurality of air inlets 30. Because of the different geometries of the pilot burner tubes 42 and the air inlet tubes 40, acoustic waves within the main combustion chamber 32 act to dampen any combustion instabilities, and in so doing act as a Helmholtz resonator. Because the geometry of the combustor assembly 18 is fixed through all operating conditions, the benefits, including dynamics mitigation and providing the desired swirl angles, are also realized throughout the full range of operating conditions.

The gas turbine engine 10, combustor assembly 18 and embodiments described herein may provide the benefits of having a reduced length engine, a reduced volume combustor, a reduction in part count and other benefits as described above.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a compressor assembly for discharging compressed air;
   a combustor assembly in flow communication with the compressor assembly, the combustor assembly receiving the compressed air from the compressor assembly, the combustor assembly comprising:
  a circumferential main combustion chamber;
  a plurality of air inlets, each air inlet of the plurality of air inlets having an air inlet tube, the plurality of air inlets dispensing air into the circumferential main combustion chamber; and
  at least one swirl-stabilized pilot burner, the at least one swirl-stabilized pilot burner dispersing combustion gases into the circumferential main combustion chamber, the at least one swirl-stabilized pilot burner comprising:
    a burner tube; and
    a pilot swirler mixer at an upstream end of the at least one swirl-stabilized pilot burner; and
  a turbine assembly in flow communication with the combustor assembly, the turbine assembly receiving combustion gas from the combustor assembly,
  wherein the at least one swirl-stabilized pilot burner and the plurality of air inlets are circumferentially spaced around the circumferential main combustion chamber such that the at least one swirl-stabilized pilot burner interfaces with the circumferential main combustion chamber at a different circumferential location than any air inlet of the plurality of air inlets,
  wherein a cross-sectional geometry of the burner tube is different from a cross-sectional geometry of any of the air inlet tubes, and
  wherein the at least one swirl-stabilized pilot burner and the plurality of air inlets are oriented such that their respective lengths are aligned to have a tangential component as well as a radial component.

2. The turbine engine of claim 1, wherein each of the plurality of air inlets is oriented such that it is radially inwardly offset from a tangential direction by less than 25 degrees, and
  wherein the plurality of air inlets dispenses a fuel-air mixture into the circumferential main combustion chamber.

3. The turbine engine of claim 2, wherein the at least one swirl-stabilized pilot burner is oriented such that it is radially inwardly offset from a tangential direction by less than 25 degrees.

4. The turbine engine of claim 3, wherein the at least one swirl-stabilized pilot burner and each of the plurality of air inlets are oriented such that they are aligned closer to a tangential direction than to a radial direction.

5. The turbine engine of claim 4, wherein the length of the at least one swirl-stabilized pilot burner is orthogonal to an axial direction.

6. The turbine engine of claim 1, wherein the plurality of air inlets comprises:
  a plurality of axially forward air inlets; and
  a plurality of axially aft air inlets, the plurality of axially aft air inlets adjacent and axially aft of the plurality of axially forward air inlets.

7. The turbine engine of claim 6, wherein the plurality of axially aft air inlets is circumferentially offset from the plurality of axially forward air inlets.

8. The turbine engine of claim 1, wherein each air inlet of the plurality of air inlets further comprises:
  a fuel injector, the fuel injector concentrically disposed within the air inlet tube.

9. The turbine engine of claim 8, wherein a diameter of the at least one swirl-stabilized pilot burner is two times a diameter of each of the air inlet tubes or greater.

10. The turbine engine of claim 1 further comprising:
  a combustor inner liner, the combustor inner liner connected with an axially forward wall of the circumferential main combustion chamber; and
  a combustor outer liner, the combustor outer liner connected with an axially aft wall of the circumferential main combustion chamber,
  wherein both the combustor inner liner and the combustor outer liner extend radially inward and axially aft from the respective circumferential main combustion chamber forward and aft walls, forming a combustor axial portion therebetween.

11. The turbine engine of claim 1, the turbine assembly further comprising at least one first stage turbine rotor blade, wherein combustion gases exit a combustor axial portion and enter the turbine assembly at the at least one first stage turbine rotor blade.

12. The turbine engine of claim 1, the turbine assembly further comprising at least one first stage turbine shroud, the at least one first stage turbine shroud forming a radially outer boundary of a turbine flow path at at least one first stage turbine rotor blade, wherein the at least one first stage turbine shroud is mechanically coupled to an axially aft end of a combustor outer liner.

13. The turbine engine of claim 1, the turbine assembly further comprising a radial turbine, the radial turbine disposed radially inward of the circumferential main combustion chamber, wherein combustion gases exit the circumferential main combustion chamber in a radially inward direction to enter the radial turbine.

14. The turbine engine of claim 8, wherein each air inlet of the plurality of air inlets is cone-shaped.

15. The turbine engine of claim 8, the combustor assembly further comprising a plurality of mixing troughs spaced circumferentially around the circumferential main combustion chamber, wherein at least one mixing trough of the plurality of mixing troughs is disposed at a radially outer periphery of the circumferential main combustion chamber such that a fuel-air mixture is dispensed into the plurality of mixing troughs upon exiting each of the air inlet tubes.

16. The turbine engine of claim 1, the at least one swirl-stabilized pilot burner further comprising a plurality of dilution holes, the plurality of dilution holes spaced circumferentially around a can-type burner tube,
  wherein the plurality of dilution holes permit airflow into an interior of the at least one swirl-stabilized pilot burner.

17. The turbine engine of claim 1, wherein the at least one swirl-stabilized pilot burner comprises at least two swirl-stabilized pilot burners, and further wherein the plurality of air inlets comprises at least six air inlets.

18. The turbine engine of claim 7, wherein the plurality of axially forward air inlets and the plurality of axially aft air inlets form a converging arrangement such that the plurality of axially forward air inlets are aligned at least partially in an axially aft direction and the plurality of axially aft air inlets are aligned at least partially in an axially forward direction.

19. The turbine engine of claim 17 wherein, the at least two swirl-stabilized pilot burners further comprising a plurality of dilution holes, the plurality of dilution holes spaced circumferentially around the at least two swirl-stabilized pilot burners, wherein the plurality of dilution holes introduce air into respective interiors of the at least two swirl-stabilized pilot burners, and the at least six air inlets comprising:
- a first plurality of axially forward air inlets; and
- a second plurality of axially aft air inlets, the second plurality of axially aft air inlets adjacent and axially aft of the first plurality of axially forward air inlets, wherein the second plurality of axially aft air inlets is circumferentially offset from the first plurality of axially forward air inlets.

20. A combustor, the combustor comprising:
- a circumferential main combustion chamber;
- a plurality of air inlets, each air inlet of the plurality of air inlets having an air inlet tube, the plurality of air inlets dispensing air into the circumferential main combustion chamber; and
- at least one swirl-stabilized pilot burner, the at least one swirl-stabilized pilot burner dispersing combustion gases into the circumferential main combustion chamber, the at least one swirl-stabilized pilot burner comprising:
  - a burner tube; and
  - a pilot swirler mixer at an upstream end of the at least one swirl-stabilized pilot burner, wherein the at least one swirl-stabilized pilot burner and the plurality of air inlets are circumferentially spaced around the circumferential main combustion chamber such that the at least one swirl-stabilized pilot burner interfaces with the circumferential main combustion chamber at a different circumferential location than any air inlet of the plurality of air inlets, wherein a cross-sectional geometry of the burner tube is different from a cross-sectional geometry of any of the air inlet tubes, and wherein the at least one swirl-stabilized pilot burner and the plurality of air inlets are oriented such that their respective lengths are aligned to have a tangential component as well as a radial component.

* * * * *